United States Patent [19]

Ward et al.

[11] 4,259,918
[45] Apr. 7, 1981

[54] SELF-CLEANING TRACTION WHEEL MOTION SENSOR

[75] Inventors: John A. Ward, Jackson; Carol A. Franssen, Concord, both of Mich.

[73] Assignee: Ward Industries, Inc., Jackson, Mich.

[21] Appl. No.: 51,358

[22] Filed: Jun. 25, 1979

[51] Int. Cl.³ .................. B65G 43/00; G01P 3/34
[52] U.S. Cl. .................... 116/200; 73/529; 116/74; 198/502
[58] Field of Search ............. 116/74; 198/502, 856, 198/494, 498

[56] References Cited

U.S. PATENT DOCUMENTS

| | | | |
|---|---|---|---|
| 446,881 | 2/1891 | Nye | 198/502 X |
| 703,924 | 7/1902 | Holt | 198/502 X |
| 2,034,110 | 3/1936 | Mechau | 308/3 X |
| 2,342,039 | 2/1944 | Davis | 198/498 |
| 2,608,290 | 8/1952 | Tyler | 198/494 |
| 2,629,486 | 2/1953 | Eggleston et al. | 198/502 X |
| 3,577,955 | 5/1971 | Palmer | 198/502 X |
| 3,743,913 | 7/1973 | Rebucci | 318/327 |
| 4,119,005 | 10/1978 | Ward et al. | 198/502 X |
| 4,154,995 | 5/1979 | Kantarian | 198/502 X |
| 4,174,030 | 11/1979 | Philibert | 198/494 |

*Primary Examiner*—Daniel M. Yasich
*Attorney, Agent, or Firm*—Beaman & Beaman

[57] ABSTRACT

A traction wheel motion sensor for endless conveyors which is self-cleaning of foreign matter that may enter the traction wheel housing and is spring biased toward the associated conveyor. A traction wheel housing located adjacent a moving conveyor engages the conveyor for sensing the rate of linear displacement thereof, and the wheel drives motion sensing apparatus through a belt. The housing includes a bottom surface which is obliquely oriented to the horizontal wherein foreign matter entering the housing is automatically discharged therefrom and further, the traction wheel is mounted upon apparatus biased toward the conveyor by spring means wherein the traction wheel maintains an operative driven relationship with the conveyor during conveyor operation.

5 Claims, 5 Drawing Figures

SELF-CLEANING TRACTION WHEEL MOTION SENSOR

BACKGROUND OF THE INVENTION

The invention pertains to conveyor motion sensing apparatus employing a traction wheel engaging a moving conveyor wherein the traction wheel housing is self-cleaning and the traction wheel is biased by spring means toward the conveyor.

In the handling of bulk materials in grain elevators, feed mills, coal mining and processing installations, and similar applications wherein belt conveyors are utilized, it is critical that the proper operating conditions of the conveyors be maintained during operation. The conveyed material is often transferred from one conveyor to another, and if the receiving conveyor has slowed from its designed rate of movement the conveyor will quickly overload, and may clog or otherwise malfunction resulting in damage to equipment and extended downtime for repair.

To protect conveyor systems against overloading, motor burnout and other malfunctions, it is common practice to use motion sensing devices directly associated with the conveyor which continuously sense the rate of conveyor movement, and if the rate of conveyor movement varies from a predetermined standard an alarm is energized or other control function actuated to indicate to the operator that immediate attention is required, and, in many cases, an entire conveyor system may be automatically stopped in the event one of the conveyors slow a predetermined degree. Usually, such safety devices either employ a traction wheel engaging the conveyor itself, or the motion sensing apparatus is connected to and directly driven by a conveyor roller, drive shaft or idler shaft.

Safety requirements of some states dictate that conveyor motion sensors directly indicate the rate of conveyor movement and sensors connected to roller shafts are not acceptable. In such instances traction wheels engaging the moving conveyor are employed, and apparatus of this type is disclosed in the assignee's prior U.S. Pat. No. 4,119,055. One of the problems attendant with directly engaging the moving conveyor lies in the fact that the position of the conveyor belt will often vary during use due to variations in belt tension as the load carried by the belt varies in accord with the amount of material being conveyed at any given time. Such conveyor displacement may permit the conveyor to move away from a frictional engagement with the motion sensor traction wheel rendering the motion sensor inactive and permitting a false signal that the conveyor has stopped resulting in unnecessary conveyor deenergizing and other complications.

Additionally, as the material being conveyed usually consists of relatively small particles, such particles will often fall into the traction wheel housing due to its proximity to the conveyor, and it is possible for the traction wheel housing to become clogged with such foreign matter and render the sensing apparatus inoperative. Such deficiencies are present in the assignee's apparatus as disclosed in the above mentioned patent.

SUMMARY OF THE INVENTION

A basic object of the invention is to provide motion sensing apparatus of the traction wheel type for endless conveyors wherein the traction wheel is biased toward engagement with the moving conveyor and will maintain uniform engagement therewith during limited displacement of the conveyor in a direction toward or away from the traction wheel structure.

An additional object of the invention is to provide a traction wheel motion sensor for conveyors which is of economical construction, may be easily installed, and provides an accurate sensing of the rate of movement of the conveyor engaged by the traction wheel.

Yet another object of the invention is to provide a motion sensor of the traction wheel type wherein the housing for the traction wheel is self-cleaning of foreign matter, and foreign matter will not clog the traction wheel housing during operation.

A further object of the invention is to provide a motion sensor of the traction wheel type wherein the apparatus may be readily mounted upon support means adjacent a moving conveyor and the traction wheel is biased by spring means into engagement with the conveyor.

Self-cleaning of the traction wheel housing is achieved by obliquely orienting the bottom wall or plate of the housing to the horizontal in such a manner that foreign matter entering the housing moves by gravity across the housing bottom plate and is returned to a location adjacent the conveyor. In one embodiment of the invention the traction wheel housing bottom plate is obliquely disposed to the housing mounting flange, and in another embodiment the entire housing is obliquely disposed to the horizontal and is movable supported within a guide mounted by a flange.

Biasing of the traction wheel towards the conveyor is achieved by either spring biasing the traction wheel shaft by means of bearing plates mounted within guides, or the housing, in its entirety, may be slidably supported within a guide and spring means mounted between the guide and housing bias the housing in a direction toward the conveyor. In the latter instance a greater degree of initial adjustment and displacement of the traction wheel is possible in most installations.

The spring means includes anchors and threaded adjustment members wherein the biasing force achieved by the springs may be varied in accord with the requirements for each installation.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENTS

Figure 1:
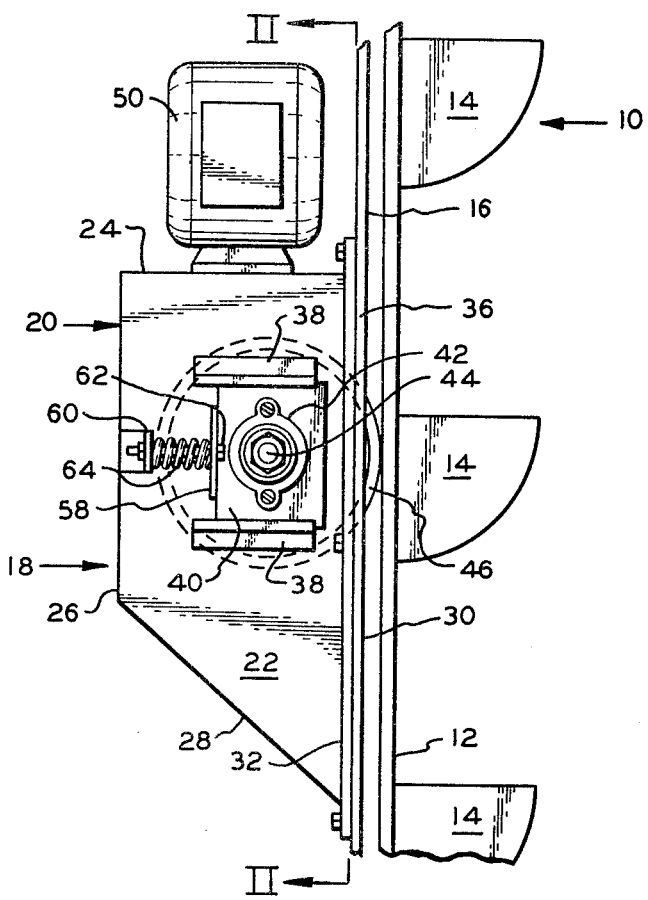
FIG. 1 is a side elevational view of a motion sensor in accord with the invention as mounted adjacent a conveyor.
Figure 2:
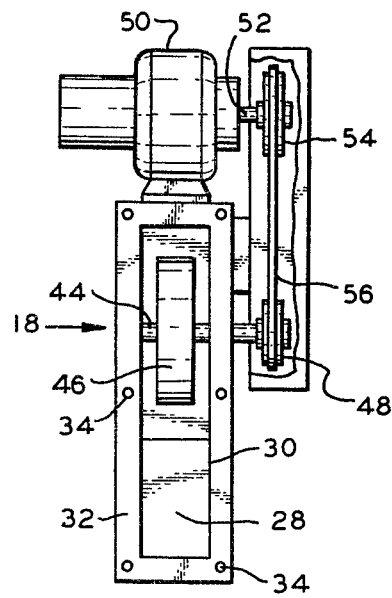
FIG. 2 is an elevational view, partially sectioned, as taken along Section II—II of FIG. 1.

With reference to FIGS. 1 and 2, a bucket conveyor is generally indicated at 10 consisting of a flexible endless belt 12 having a plurality of buckets 14 mounted thereon, the conveyor moving in an upward direction within a housing including a rear panel 16. The conveyor is loaded at a location, not shown, below the motion sensing apparatus generally indicated at 18, and as the conveyor belt 12 moves upwardly, movement of the belt to the left and right as viewed in FIG. 1 may occur due to the tension within the belt varying wherein the spacing between the belt and the panel 16 changes, within limits, during conveyor operation.

The conveyor motion sensing apparatus 18 includes a housing 20 formed of sheet metal which consists of identical sidewalls 22 bridged by an upper panel 24, a side panel 26 and a bottom plate 28. The housing is open at the side adjacent the conveyor panel 16 forming opening 30 and a mounting flange 32 defined on the housing about the opening 30 is provided with holes 34, FIG. 2, for receiving mounting bolts for mounting the housing to the conveyor panel 16. The conveyor panel is provided with a rectangular opening 36 of a size corresponding to the housing opening 30.

Upon each sidewall 22 of the housing a pair of spaced, parallel bearing plate guides 38 are mounted slidably supporting a bearing plate 40 for movement toward and away from the conveyor belt 12. An antifriction bearing 42 is mounted upon each bearing plate 40, and the bearings rotatably support the traction wheel shaft 44 upon which traction wheel 46 is fixed. The traction wheel 46 is provided with a periphery of friction material, and the shaft 44 extends beyond a housing sidewall having a pulley 48 fixed thereon.

A rotary motion sensor 50 is mounted upon the housing 20 and includes an input shaft 52 upon which pulley 54 is fixed, and the pulley 54 is drivingly connected to the traction wheel shaft pulley 48 by flexible belt 56. Thus, rotation of the traction wheel 46 drives the sensor 50. The sensor may take a variety of forms, and, preferably, it is of the type manufactured by the assignee, Ward Industries, Inc. of Jackson, Mich., Model F364-D wherein an electric signal is produced which may be monitored to indicate the rotational speed of the traction wheel, which is proportional to the linear rate of movement of the conveyor 10.

To insure that the traction wheel maintains a sufficient engagement with the conveyor belt 12 to assure continuous traction wheel rotation, even though the spacing between the conveyor belt and the panel 16 may vary within limits, each bearing plate 40 is provided with an anchor plate 58 which is in opposed relationship to an anchor plate 60, consisting of an angle iron, affixed to a sidewall 22. A threaded bolt 62 extends between anchor plates 58 and 60 and a compression spring 64 is mounted thereon. The bolts 62 are slidably received within holes in the anchor plates and the compression springs 64 will bias the bearing plates 40 and traction wheel 46 toward the conveyor belt 12 with a force depending upon the characteristics of the springs, and the degree of compression thereof. Thus, should the conveyor belt move to the right, FIG. 1, the springs 64 will move the mounting plates and traction wheel to the right to the limits permitted by the bolts 62, and if the conveyor belt is displaced to the left during its operation the springs will be compressed preventing stressing of the sensor components and conveyor belt. Thus, it will be appreciated that the described apparatus will permit consistent frictional engagement between the traction wheel and conveyor belt.

Because of the opening 36 in the conveyor panel 16, and the open end 30 of the housing 20, particles of the material being conveyed will enter these openings and enter the housing. However, due to the oblique orientation of the bottom plate 28 such material will, upon falling upon the bottom plate, slide therefrom back through the panel opening into the conveyor structure, and the oblique orientation of the bottom plate 28 renders the apparatus self-cleaning.

Figure 3:
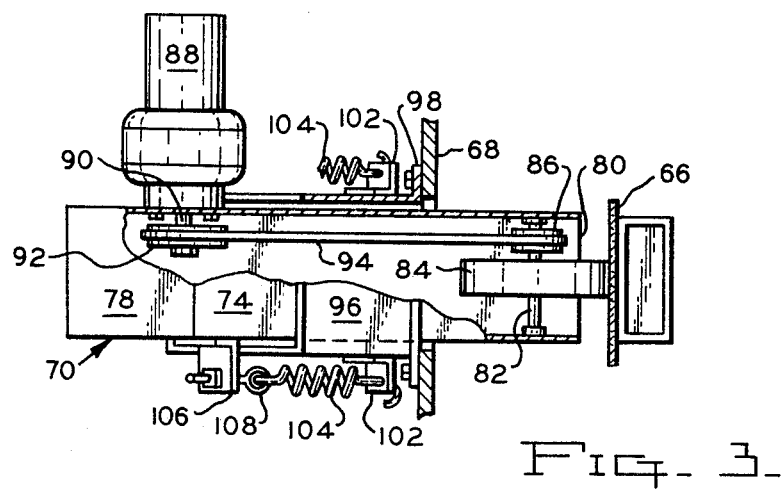
FIG. 3 is a top plan view of another embodiment of motion sensor in accord with the invention, partially sectioned, as mounted adjacent a conveyor.
Figure 4:
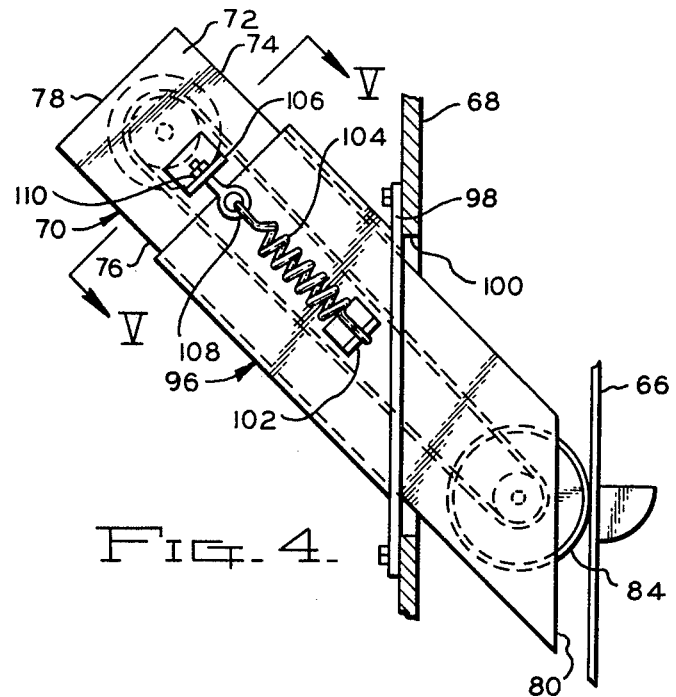
FIG. 4 is a side elevational view of the embodiment of FIG. 3.
Figure 5:
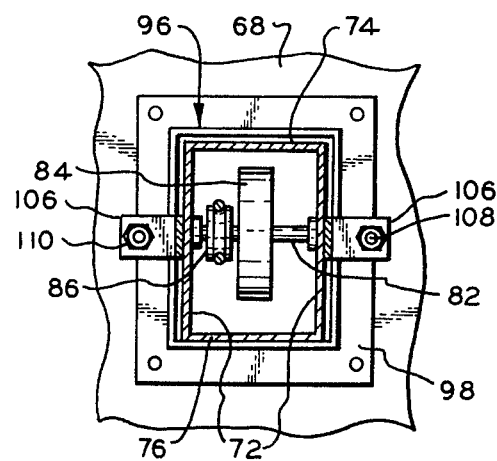
FIG. 5 is a sectional view as taken along Section V—V of FIG. 4.

Another embodiment of the concepts of the invention is shown in FIGS. 3-5 wherein such embodiment is capable of use with a conveyor 66 which is spaced a greater distance from the conveyor shroud panel 68 than with the embodiment of FIGS. 1 and 2, and in this embodiment the traction wheel housing 70 is of an elongated configuration.

The housing 70 consists of an elongated tubular member having sidewalls 72, and upper wall 74 and a lower plate 76. The end panel 78 closes the end of the housing remote from the conveyor end 80, and the housing end 80 is open and obliquely disposed to the length of the housing.

A shaft 82 is rotatably mounted within the housing 70 adjacent the end 80 and the traction wheel 84 having a friction material periphery is fixed thereon. Likewise, a driving pulley 86 is fixed upon the shaft 82. As will be appreciated from the drawing, the housing open end 80 and traction wheel 84 are so oriented that a portion of the traction wheel extends from the open end for engagement with the conveyor 66.

The motion sensor 88 is mounted adjacent the end panel 78 upon a sidewall 72, and this sensor may be of the form previously identified as manufactured by the assignee. The input shaft 90 includes a pulley 92 mounted thereon which is drivingly connected to the traction wheel pulley 86 by flexible belt 94.

The housing 70 is supported within a guide 96 which is of a tubular configuration corresponding in cross section to that of the housing and of slightly greater cross sectional dimension as will be appreciated from FIG. 5. The guide 96 includes a mounting flange 98 obliquely disposed to the longitudinal axis of the guide configuration wherein mounting of the flange upon the conveyor panel 68 will orient the apparatus as apparent in FIG. 4. The panel 68 includes an opening 100 through which the housing 70 extends and as the flange 98 and housing end 80 are parallel, the angle is such as to position housing opening 80 substantially parallel to the plane of the conveyor 66.

The housing 70 is slidably supported within the guide 96, and each side of the guide includes a spring anchor 102 to which one end of a tension spring 104 is attached. Each sidewall 72 of the housing adjacent the end 78 also includes a spring anchor 106 in which a threaded eye bolt 108 is mounted to which the other end of the tension springs 104 are mounted. Thus, the springs will bias the housing 70 toward the right, FIGS. 3 and 4, to maintain the traction wheel 84 in engagement with the conveyor belt even though the conveyor belt may move toward and away from the panel 68.

Adjustment of the biasing force of the springs 104 is achieved by location of nuts 110 upon the threaded shaft of the eye bolts 108. Due to the oblique orientation of the housing 70 to the horizontal, foreign matter entering the housing through open end 80, upon falling upon housing bottom plate 76 will slide from the housing through open end 80 for discharge back into the conveyor area.

It will be appreciated that both of the disclosed motion sensing embodiments are self-cleaning and are automatically biased toward the conveyor belt to assure a uniform frictional driving engagement between the conveyor and the traction wheel. It is appreciated that various modifications to the disclosed embodiments may be apparent to those skilled in the art without departing from the spirit and scope of the invention.

We claim:

1. In a traction wheel motion sensor for sensing the movement of a moving conveyor member including a housing having an open end, a mounting flange defined on said housing at the open end for mounting the housing on a support adjacent the conveyor member to be sensed, a traction wheel shaft rotatably mounted upon the housing, a traction wheel mounted on the shaft having a periphery extending from the housing open end, the housing including a pair of spaced sidewalls, guide means slidably mounting a bearing plate upon each sidewall for movement toward and away from the housing open end, a bearing mounted upon each bearing plate, the traction wheel shaft being rotatably mounted in the bearings and the traction wheel being located within the housing intermediate the sidewalls whereby adjustment of the bearing plates on the housing varies the degree of extension of the periphery of the traction wheel from the open end, a rotary motion sensing device mounted upon the housing having a rotatable input shaft, and power transmission means drivingly interconnecting the input shaft with the traction wheel whereby the input shaft is rotated by the ktraction wheel upon the traction wheel engaging and being rotated by a moving conveyor member, the improvement comprising, spring means mounted on said housing biasing said bearing plates and traction wheel shaft toward said housing open end for biasing said traction wheel into engagement with a moving conveyor member, and said housing including a bottom portion interposed between said sidewalls intersecting said housing open end, said bottom portion being obliquely oriented to the plane of said mounting flange whereby upon mounting of said housing on a substantially vertically disposed support said lowermost portion of said bottom portion occurs at the intersection of said bottom portion and housing open end whereby foreign matter entering said housing through said open end is discharged from said housing upon said bottom portion.

2. In a traction wheel motion sensor as in claim 1 first spring anchor means defined upon each housing sidewall, second spring anchor means defined on each bearing plate in opposed relation to said first spring anchor means mounted on a common adjacent sidewall, said spring means comprising a compression coil spring interposed between said first and second spring anchor means mounted upon a common sidewall.

3. A traction wheel motion sensor for sensing the movement of a moving conveyor member comprising, in combination, an elongated housing having an axis, first and second ends and a periphery defined by top, bottom and side walls, said housing top, bottom and side walls defining a rectangular cross sectional housing configuration, an opening defined in said first end, a traction wheel shaft rotatably mounted on said housing adjacent said first end, a traction wheel mounted on said shaft having a periphery extending from said first end opening, a rotary motion sensing device mounted on said housing having a rotatable input shaft, power transmission means drivingly interconnecting said traction wheel to said sensing device input shaft, housing mounting means for mounting said housing adjacent a moving conveyor supporting said housing comprising a guide supporting said housing for relative linear sliding displacement in the direction of said housing axis, said guide comprising a rectangular tubular member closely slidably receiving said housing, a mounting flange affixed to said guide, the plane of said mounting flange being obliquely oriented to said guide and direction of housing displacement whereby mounting said flange on a vertical support disposes said housing open end downwardly to permit foreign matter within said housing to discharge from said open end, a first spring anchor defined on said housing, a second spring anchor defined on said housing mounting means, and a spring interposed between said first and second anchors biasing said housing in the direction of said open end for maintaining said traction wheel in engagement with the conveyor member.

4. In a traction wheel motion sensor as in claim 3, a first spring anchor defined on each side wall of said housing, a pair of second spring anchors defined on said housing mounting means on opposite sides of said tubular member in alignment with a first anchor, and a tension spring interposed between each set of aligned first and second anchors.

5. In a traction wheel motion sensor as in claim 4, threaded spring adjustment means associated with each spring for adjusting the biasing force of each spring.

* * * * *